United States Patent
Neill et al.

(10) Patent No.: US 8,574,694 B2
(45) Date of Patent: Nov. 5, 2013

(54) PACKAGING SHEET WITH IMPROVED CUTTING PROPERTIES

(75) Inventors: Jesten David Neill, Oshkosh, WI (US); Curtis Randolph Barr, Neenah, WI (US); Connie Louise Gherena, Menasha, WI (US); Dwight Dennis Redding, Appleton, WI (US)

(73) Assignee: Curwood, Inc., Oshkosh, WI (US)

( * ) Notice: Subject to any disclaimer, the term of this patent is extended or adjusted under 35 U.S.C. 154(b) by 111 days.

(21) Appl. No.: 13/310,034

(22) Filed: Dec. 2, 2011

(65) Prior Publication Data

US 2012/0308751 A1 Dec. 6, 2012

Related U.S. Application Data

(63) Continuation-in-part of application No. 12/611,880, filed on Nov. 3, 2009.

(51) Int. Cl.
*B32B 27/30* (2006.01)
*B32B 27/36* (2006.01)
*B32B 27/08* (2006.01)

(52) U.S. Cl.
USPC .......................................... 428/35.7; 428/480

(58) Field of Classification Search
CPC ...... B32B 27/30; B32B 27/36; B32B 2270/00
USPC ................................................ 428/35.7, 480
See application file for complete search history.

(56) References Cited

U.S. PATENT DOCUMENTS

| | | |
|---|---|---|
| 3,955,040 A | 5/1976 | Schirmer |
| 4,025,376 A | 5/1977 | Schirmer |
| 4,178,401 A | 12/1979 | Sun et al. |
| 4,254,169 A | 3/1981 | Schroeder |
| 4,440,824 A | 4/1984 | Bonis |
| 4,462,953 A | 7/1984 | Feil et al. |
| 4,572,854 A | 2/1986 | Dallmann et al. |
| 4,601,930 A | 7/1986 | Engelsberger |
| 4,713,268 A | 12/1987 | Carson |
| 4,753,986 A | 6/1988 | Wang |
| 4,847,148 A | 7/1989 | Schirmer |
| 4,879,177 A | 11/1989 | Boice |
| 4,921,749 A | 5/1990 | Bossaert et al. |

(Continued)

FOREIGN PATENT DOCUMENTS

| | | |
|---|---|---|
| EP | 0 854 032 A2 | 7/1919 |
| EP | 219329 A3 | 6/1988 |

(Continued)

OTHER PUBLICATIONS

ASTM International, "Standard Test Method for High Speed Puncture Properties of Plastics Using Load and Displacement Sensors, D3683-08", West Conshohocken, PA, USA.

(Continued)

*Primary Examiner* — Michele L Jacobson
(74) *Attorney, Agent, or Firm* — Tom J. Hall

(57) ABSTRACT

A non-oriented thermoformable packaging sheet having a rigid component layer comprising a blend of an aromatic polyester and a styrenic polymer, where the total amount of styrenic polymer present in the sheet relative to the total weight of the sheet is at least between 3.0% and 4.0% by weight. The packaging sheet has a thickness of at least 5 mil and a normalized impact strength of 0.16 ft*lbf/mil or less total energy as measured in accordance with ASTM D3763-08 test method.

15 Claims, 6 Drawing Sheets

(56) References Cited

U.S. PATENT DOCUMENTS

| | | |
|---|---|---|
| 4,927,690 A | 5/1990 | Welsh |
| 4,927,691 A | 5/1990 | Bekele |
| 4,935,089 A | 6/1990 | Schirmer |
| 5,041,499 A | 8/1991 | Blakely |
| 5,043,204 A | 8/1991 | Itaba et al. |
| 5,047,450 A | 9/1991 | Wilder |
| 5,075,143 A | 12/1991 | Bekele |
| 5,158,836 A | 10/1992 | Schirmer et al. |
| 5,164,297 A | 11/1992 | Josephson et al. |
| 5,213,744 A | 5/1993 | Bossaert |
| 5,230,948 A | 7/1993 | Preiss et al. |
| 5,276,089 A | 1/1994 | Colby et al. |
| 5,298,202 A | 3/1994 | Schirmer |
| 5,310,497 A | 5/1994 | Ve Speer et al. |
| 5,316,826 A | 5/1994 | Kotani et al. |
| 5,340,875 A | 8/1994 | Yang et al. |
| 5,382,470 A | 1/1995 | Vicik |
| 5,395,890 A | 3/1995 | Nakano et al. |
| 5,407,713 A | 4/1995 | Wilfong et al. |
| 5,434,010 A | 7/1995 | Smith et al. |
| 5,496,295 A | 3/1996 | Wilfong et al. |
| 5,540,878 A | 7/1996 | Schrenk et al. |
| 5,605,660 A | 2/1997 | Buongiorno et al. |
| 5,620,802 A | 4/1997 | Arsac et al. |
| 5,643,375 A | 7/1997 | Wilfong et al. |
| 5,663,002 A | 9/1997 | Schirmer |
| 5,688,866 A | 11/1997 | Silvis et al. |
| 5,730,919 A | 3/1998 | Wilfong et al. |
| 5,766,744 A | 6/1998 | Fanselow et al. |
| 5,770,287 A | 6/1998 | Miranda et al. |
| 5,895,694 A | 4/1999 | Zavadsky et al. |
| 5,928,740 A | 7/1999 | Wilhoit et al. |
| 5,972,447 A | 10/1999 | Hata et al. |
| 5,983,604 A | 11/1999 | Wilfong et al. |
| 5,985,421 A | 11/1999 | Gerber |
| 5,990,217 A | 11/1999 | Nakano et al. |
| 6,085,942 A | 7/2000 | Redmond |
| 6,143,383 A | 11/2000 | Giori |
| 6,258,423 B1 | 7/2001 | Giori |
| 6,270,912 B1 | 8/2001 | Peet |
| 6,300,398 B1 | 10/2001 | Jialanella et al. |
| 6,383,589 B1 | 5/2002 | Horan et al. |
| 6,413,346 B1 | 7/2002 | Planeta et al. |
| 6,415,925 B1 | 7/2002 | Fux |
| 6,432,496 B1 | 8/2002 | Klosiewicz |
| 6,455,161 B1 | 9/2002 | Regnier et al. |
| 6,511,723 B1 | 1/2003 | Engelaere |
| 6,569,538 B1 | 5/2003 | Kaschel |
| 6,770,712 B2 | 8/2004 | Golze et al. |
| 6,809,168 B2 | 10/2004 | Agarwal et al. |
| 6,815,023 B1 | 11/2004 | Tatarka et al. |
| 6,964,816 B2 | 11/2005 | Schell et al. |
| 6,969,556 B2 | 11/2005 | Jeschke |
| 6,969,740 B2 | 11/2005 | Klosiewicz |
| 6,984,442 B2 | 1/2006 | Brebion et al. |
| 7,135,234 B2 | 11/2006 | Donnelly et al. |
| 7,176,259 B1 | 2/2007 | Klosiewicz |
| 7,201,966 B2 | 4/2007 | Lischefski |
| 7,205,040 B2 | 4/2007 | Peiffer et al. |
| 7,255,902 B2 | 8/2007 | Reiners et al. |
| 7,422,782 B2 | 9/2008 | Haedt et al. |
| 7,534,829 B2 | 5/2009 | Tai et al. |
| 7,556,152 B2 | 7/2009 | Lechelle |
| 7,582,341 B2 | 9/2009 | Pettis |
| 7,838,620 B2 | 11/2010 | Crawford et al. |
| 8,092,920 B2 | 1/2012 | Saavedra et al. |
| 8,110,259 B2 | 2/2012 | Siegel et al. |
| 2002/0102200 A1 | 8/2002 | Jungerhans |
| 2002/0103300 A1 | 8/2002 | Klosiewicz |
| 2003/0211298 A1 | 11/2003 | Migliorini et al. |
| 2004/0067382 A1 | 4/2004 | Niepelt |
| 2004/0170854 A1 | 9/2004 | Kuo et al. |
| 2004/0197584 A1 | 10/2004 | Jeschke |
| 2006/0020067 A1 | 1/2006 | Brant et al. |
| 2007/0014953 A1 | 1/2007 | Siegel et al. |
| 2007/0036960 A1 | 2/2007 | Lambert et al. |
| 2007/0082154 A1 | 4/2007 | Ambroise et al. |
| 2007/0090108 A1 | 4/2007 | Kaczmarek et al. |
| 2007/0104901 A1 | 5/2007 | Siegel et al. |
| 2007/0202337 A1 | 8/2007 | Lischefski et al. |
| 2007/0259142 A1 | 11/2007 | Lischefski et al. |
| 2008/0026171 A1 | 1/2008 | Gullick et al. |
| 2008/0118749 A1 | 5/2008 | Aubee et al. |
| 2008/0145670 A1 | 6/2008 | Song et al. |
| 2008/0227900 A1 | 9/2008 | Borke et al. |
| 2008/0286547 A1 | 11/2008 | Hubbard et al. |
| 2009/0029182 A1 | 1/2009 | Aubee et al. |
| 2009/0110888 A1 | 4/2009 | Wuest et al. |
| 2011/0076506 A1 | 3/2011 | Blok et al. |
| 2011/0104342 A1 | 5/2011 | Glaser et al. |

FOREIGN PATENT DOCUMENTS

| | | |
|---|---|---|
| EP | 0 530 648 A2 | 3/1993 |
| EP | 0 605 081 A1 | 7/1994 |
| EP | 712915 A1 | 5/1996 |
| EP | 625343 A3 | 7/1996 |
| EP | 0 757 064 A1 | 2/1997 |
| EP | 992339 A2 | 12/2000 |
| EP | 1600384 A1 | 11/2005 |
| EP | 1666243 A1 | 6/2006 |
| EP | 1 272 328 B1 | 11/2007 |
| JP | 10100346 A1 | 4/1998 |
| JP | 2002283515 A | 10/2002 |
| WO | 9101158 A1 | 2/1991 |
| WO | 9818620 A1 | 5/1998 |
| WO | 0226494 A2 | 4/2002 |
| WO | 03002344 A1 | 9/2003 |

OTHER PUBLICATIONS

Chevron Phillips Chemical, "K.Resin Styrene-Butadiene Copolymer Blends", Technical Service Memorandum 316, Chevron Philips Chemical Company, LP, Houston, TX, USA.

PACKAGING SHEET WITH IMPROVED CUTTING PROPERTIES

RELATED APPLICATIONS

The present application is a continuation-in-part of application Ser. No. 12/611,880, filed Nov. 3, 2009, the entirety of which is incorporated in the application by this reference.

BACKGROUND OF THE INVENTION

This present application relates to a packaging sheet, specifically, a packaging sheet with improved cuttability properties.

Packaging sheets are used for many purposes. One of these many purposes includes thermoforming the sheet into articles, such as trays, cups, etc., which may then be used to package food, non-food, medical and industrial products. Typically, these applications require thermoformable sheets which are non-oriented.

One packaging sheet that is currently used for thermoforming into packaging articles comprises a fully coextruded sheet with polyvinylidene chloride (PVdC) sandwiched between high impact polystyrene (HIPS), with ethylene vinyl acetate copolymer (EVA) used to laminate the central PVdC layer to the outer HIPS layers. This PVdC sheet generally has no significant sticking, forming, cutting, filling or sealing issues when used for thermoforming into articles. However, it is well known that PVdC has many environmental health concerns, with chlorine as the source of many of these concerns. Both the manufacture and the disposal of PVdC produce dioxin, a highly carcinogenic chemical; and many localities do not permit a converter or packager to reprocess or landfill-dispose of packaging materials containing PVdC. As a result, non-oriented chlorine-free materials may be preferred.

A packaging sheet that is currently used comprises a fully coextruded sheet with ethylene vinyl alcohol copolymer (EVOH) sandwiched between HIPS, with high density polyethylene (HDPE) between the central EVOH layer and the outer HIPS layers. (See, for example, U.S. Pat. No. 5,972,447, published Feb. 15, 2007, which is incorporated in its entirety in this application by this reference.) Such a sheet may have a layer structure of HIPS/HDPE/EVOH/HDPE/HIPS or HIPS/tie/HDPE/tie/EVOH/tie/HDPE/tie/HIPS (where "/" is used to indicate the layer boundary). Both structures are non-oriented and chlorine-free. However, both structures are known to have significant forming and cutting issues when used for thermoforming into articles.

What is needed is a packaging sheet that has no significant sticking, forming, cutting, filling or sealing issues when used for thermoforming into articles.

BRIEF SUMMARY OF THE INVENTION

The need for packaging sheets which may be thermoformed with improved cutting properties is met by a non-oriented sheet having a rigid component layer comprising a blend of an aromatic polyester and a styrenic polymer, a thickness of at least 5 mil (127 micron) and a normalized impact strength of 0.16 ft*lbf/mil or less total energy as measured in accordance with ASTM D3763-08 test method. Normalized impact strength values of 0.16 ft*lbf/mil or less total energy are indicative of an ease of cutting the packaging sheet with a thickness of at least 5 mil (127 micron). The non-oriented sheet has a thickness of at least between 5 mil (127 micron) and 15 mil (381 micron). The total amount of styrenic polymer present in the sheet relative to the total weight of the sheet is at least between about 3.0% and 4% by weight. It is also contemplated that the total amount of styrenic polymer present in the sheet relative to the total weight of the sheet is 17% by weight or less; less than 15% by weight or less than 12% by weight.

In one aspect, the non-oriented packaging sheet comprises a single rigid component layer comprising a blend of aromatic polyester and styrenic polymer. In another aspect, the non-oriented packaging sheet comprising a first rigid component layer and a second rigid component layer. The first rigid component layer and/or the second rigid component layer may comprise various materials. The sheet may be of any number of multiple layers (i.e., two or more layers) and may comprise various materials.

The blend of the rigid component layer includes an aromatic polyester which may comprise any aromatic polyester known in the art. Non-limiting examples of aromatic polyester include polyethylene terephthalate, crystalline polyethylene terephthalate, amorphous polyethylene terephthalate, glycol-modified polyethylene terephthalate, polybutylene terephthalate, polyethylene naphthalate, a blend of polyethylene terephthalate and crystalline polyethylene terephthalate, a blend of polyethylene terephthalate and amorphous polyethylene terephthalate, a blend of polyethylene terephthalate and glycol-modified polyethylene terephthalate or blends thereof. A preferred aromatic polyester is amorphous polyethylene terephthalate, glycol-modified polyethylene terephthalate, and blends thereof. A most preferred aromatic polyester is amorphous polyethylene terephthalate.

The blend of the rigid component layer includes any styrenic polymer known in the art. Non-limiting examples of styrenic polymers include high impact polystyrene; general purpose polystyrene; styrene butadiene copolymer; a blend of high impact polystyrene and general purpose polystyrene; a blend of high impact polystyrene, general purpose polystyrene and styrene butadiene copolymer; or blends thereof. A preferred styrenic polymer is general purpose polystyrene.

In one embodiment, the non-oriented packaging sheet is a monolayer sheet comprising a single rigid component layer comprising a blend of an aromatic polyester and styrenic polymer, a thickness of at least 5 mil (127 micron) and a normalized impact strength of 0.16 ft*lbf/mil or less total energy as measured in accordance with ASTM D3763-08 test method.

In another embodiment, the non-oriented packaging sheet is a multilayer sheet comprising a single rigid component layer comprising a blend of an aromatic polyester and styrenic polymer, a thickness of at least 5 mil (127 micron) and a normalized impact strength of 0.16 ft*lbf/mil or less total energy as measured in accordance with ASTM D3763-08 test method. In this embodiment, the rigid component may be either an outer layer or an intermediate layer (i.e., a layer that is positioned between two other layers).

In further embodiments, the non-oriented packaging sheet is a multilayer sheet comprising a first rigid component layer and a second rigid component layer where each of the rigid component layers comprise a blend of an aromatic polyester and styrenic polymer. In this embodiment, the sheet has a thickness of at least 5 mil (127 micron) and a normalized impact strength of 0.16 ft*lbf/mil or less total energy as measured in accordance with ASTM D3763-08 test method. The first and second rigid components may be an outer layer, or the first rigid component layer may be an outer layer and the second rigid component layer may be an intermediate layer, or both the first and the second rigid component layers may be an intermediate layer. In this embodiment, additional layers may be positioned between the first and second rigid component layers. For example, a coextruded film, blown coextruded or cast coextruded films may be positioned between two outer rigid component layers. The coextruded film may be cast or blown coextruded and include one or more film layers. It is also contemplated that the first and second rigid component layers may be intermediate layers when two layers are joined to the outer surface of each first and second rigid component layers and with one or more film layers positioned therebetween.

It is further contemplated that the non-oriented packaging sheet may include multilayer films comprising various materials and/or layers to impart particular moisture and/or oxygen barrier materials, and other properties to the sheet as desired. In one embodiment, the non-oriented packaging sheet comprises a sealant and/or a barrier component. The sealant component may include a monolayer or multilayer blown coextruded film which enables the packaging sheet to be heat sealed to itself or to another material. Preferably, the monolayer or multilayer blown coextruded sealant film includes a sealing layer. The barrier component may include a monolayer or multilayer blown coextruded film. A monolayer barrier blown coextruded film may include a layer of ethylene vinyl alcohol copolymer. A multilayer barrier blown coextruded film may include a layer of ethylene vinyl alcohol copolymer sandwiched between two layers of nylon or nylon blends.

In still another embodiment, a package comprises the packaging sheet. In further embodiments, the packaging sheet may be thermoformed into various packages and contain various products.

DETAILED DESCRIPTION OF THE INVENTION

Figure 1:
FIG. 1 is a diagrammatic cross-sectional view of a first general embodiment of the non-oriented packaging sheet described in the present application.

As used throughout this application, the term "sheet" refers to a plastic web of any thickness and is not limited to a plastic web having a thickness of greater than about 10 mil. The term "film" means a plastic web of any thickness and is not limited to a plastic web having a thickness of less than about 10 mil. For convenience, this application may refer to a sheet having a thickness greater than or including a film; but the terms are not limited to such interpretation.

As used throughout this application, the term "about" refers to approximately, rounded up or down to, reasonably close to, in the vicinity of, or the like. The term "approximate" is synonymous with the term "about."

As used throughout this application, the term "component" refers to a monolayer or multilayer film comprising thermoplastic resin.

As used throughout this application, the term "rigid component" refers to a component selected from the group consisting of a blend of styrenic polymer and aromatic polyester.

As used throughout this application, the term "non-oriented" refers to a monolayer or multilayer web, sheet or film that is substantially free of post-formation orientation. It is known by those skilled in the art that post-extrusion orientation may significantly affect a film's tensile properties.

As used throughout this application, the term "multilayer" refers to a plurality of layers in a single film structure generally in the form of a sheet or web which can be made from a polymeric material or a non-polymeric material bonded together by any conventional means known in the art (i.e., coextrusion, lamination, coating or a combination of such). The packaging sheet described in the present application comprises a multilayer film including as many layers as desired and, preferably, at least three layers.

As used throughout this application, the term "thermoplastic" refers to a polymer or polymer mixture that softens when exposed to heat and then returns to its original condition when cooled to room temperature. In general, thermoplastic materials may include natural or synthetic polymers. Thermoplastic materials may further include any polymer that is cross-linked by either radiation or chemical reaction during manufacturing or post-manufacturing processes.

As used throughout this application, the term "polymer" refers to a material which is the product of a polymerization or copolymerization reaction of natural, synthetic or combined natural and synthetic monomers and/or co-monomers and is inclusive of homopolymers, copolymers, terpolymers, etc. In general, the layers of the non-oriented packaging sheet described in the present application may comprise a single polymer, a mixture of a single polymer and non-polymeric material, a combination of two or more polymers blended together, or a mixture of a blend of two or more polymers and non-polymeric material. It will be noted that many polymers may be synthesized by the mutual reaction of complementary monomers. It will also be noted that some polymers are obtained by the chemical modification of other polymers such that the structure of the macromolecules that constitute the resulting polymer can be thought of as having been formed by the homopolymerization of a hypothetical monomer.

As used throughout this application, the terms "thermoformable" and "thermoformed" refer to monolayer or multilayer thermoplastic polymer sheets, films or webs having sufficient rigidity or stiffness to be formed into a desired shape by the application of a differential pressure between the film or sheet and a mold, by the application of heat, by the combination of heat and the application of a differential pressure between the film or sheet and a mold, or by any thermoforming technique known to those skilled in the art. For purposes of this application, the term "thermoformable" also refers to non-oriented monolayer or multilayer thermoplastic polymer sheets, films or webs having a thickness of at least 5 mil or at least between 5 ml and 15 mil.

As used throughout this application, the term "impact strength" refers to the Dynatup® Impact Strength of a polymer sheet, film or web which is a measure the energy absorbed during impact events. Typically, a weighted crosshead is released and slides on guide bars. A steel flag on the carriage passes through the velocity detector block. The tup (instrumented load cell) attached to the crosshead contacts the specimen. The velocity and load data are recorded and used to calculate the impact energy. Impact strength may be measured using a Dynatup® minitower (available from Instron Corp., Norwood, Mass.) operating under Dynatup® Impulse Impact Testing Software Version 2.2.1. The measurement is conducted with a 0.5 in tup with a hemispherical tip mounted on a crosshead weighing 4.23 lb (1.92 kg) being dropped from a height of 477 mm onto a test sample and the puncture event is flag-triggered with a 30 msec data collection period at 23° C. Impact strength may be reported as total energy absorbed in foot*pound-force or (ft*/lbf). Impact strength is measured in accordance with ASTM D3763-08 test method which is incorporated in its entirety in this application by this reference.

As used throughout this application, the term "coextruded" refers to the process of extruding two or more polymer materials through a single die with two or more orifices arranged so that the extrudates merge and weld together into a laminar structure before chilling (i.e., quenching.) Co-extrusion methods known to a person of ordinary skill in the art include but are not limited to blown film co-extrusion and flat die or slot cast co-extrusion. The flat die or slot cast process includes extruding polymer streams through a flat or slot die onto a chilled roll and subsequently winding the film onto a core to form a roll of film for further processing.

As used throughout this application, the term "blown film" refers to a film produced by the blown coextrusion process. In the blown coextrusion process, streams of melt-plastified polymers are forced through an annular die having a central mandrel to form a tubular extrudate. The tubular extrudate may be expanded to a desired wall thickness by a volume of fluid (e.g., air or other gas) entering the hollow interior of the extrudate via the mandrel, and then rapidly cooled or quenched by any of various methods known to those of skill in the art.

As used throughout this application, the term "layer" refers to a discrete film or sheet component which is coextensive with the film or sheet and has a substantially uniform composition. In a monolayer film, "film," "sheet" and "layer" would be synonymous.

As used throughout this application, the term "intermediate layer" refers to a layer that is positioned between two other layers. In contrast, the term "outer layer" refers to a layer having only one other layer joined thereto.

As used throughout this application, the term "barrier" refers to any material which controls a permeable element of the film or sheet and includes but is not limited to oxygen barrier, moisture barrier, chemical barrier, heat barrier and odor barrier.

As used throughout this application, the term "copolymer" refers to a polymer product obtained by the polymerization reaction or copolymerization of at least two monomer species. Copolymers may also be referred to as bipolymers. The term "copolymer" is also inclusive of the polymerization reaction of three, four or more monomer species having reaction products referred to terpolymers, quaterpolymers, etc.

As used throughout this application, the term "tie material" refers to a polymeric material serving a primary purpose or function of adhering two surfaces to one another, presumably the planar surfaces of two film layers. A tie material adheres one film layer surface to another film layer surface or one area of a film layer surface to another area of the same film layer surface. The tie material may comprise any polymer, copolymer or blend of polymers having a polar group or any other polymer, homopolymer, copolymer or blend of polymers, including modified and unmodified polymers (such as grafted copolymers), which provide sufficient interlayer adhesion to adjacent layers comprising otherwise nonadhering polymers. Tie materials include but is not limited to glycidyl methacrylate-modified copolymers of ethylene (e.g., epoxy-functional tie materials), anhydride-modified (such as maleic anhydride modified) copolymers of ethylene, copolymers of ethylene and a carboxylic acid (such as an acrylic acid), copolymers of ethylene and an ester (such as an acrylate), adhesive materials, such as, but not limited to pressure sensitive adhesives, and blends of such. Specific non-limiting examples of tie material include Lotader® AX 8900 available from Arkema Inc. (Philadelphia, Pa.); GT4157 available from Westlake Chemical Corporation (Houston, Tex.); DuPont™ Bynel® 41E710 available from E.I. du Pont de Nemours and Company, Inc. (Wilmington, Del.); DuPont™ Bynel® 41E687 available from E.I. du Pont de Nemours and Company, Inc. (Wilmington, Del.); Plexar® PX 3084 available from Equistar Chemicals LP (Houston, Tex.); Admer™ AT2118A available from Mitsui Chemicals America, Inc. (Rye Brook, N.Y.); DuPont™ Bynel® 40E529 available from E.I. du Pont de Nemours and Company, Inc. (Wilmington, Del.); DuPont™ Bynel® 4164 available from E.I. du Pont de Nemours and Company, Inc. (Wilmington, Del.); Plexar® PX 3080 available from Equistar Chemicals LP (Houston, Tex.); and Lotader® 2210 available from Arkema Inc. (Philadelphia, Pa.). Examples of pressure sensitive adhesives (PSA) include but are not limited to those compositions that comprise a base elastomeric resin and a tackifier to enhance the ability of the adhesive to instantly bond and to enhance the bond strength. Examples of elastomers used as the base resin in tackified multicomponent PSA include but are not limited to natural rubber, polybutadiene, polyorganosiloxanes, styrene-butadiene rubber, carboyxlated styrene-butadiene rubber, polyisobutylene, butyl rubber, halogenated butyl rubber, block polymers based on styrene with isoprene, butadiene, ethylene-propylene or ethylene-butylene, or combinations of such elastomers. (See Yorkgitis, "Adhesive Compounds," *Encyclopedia of Polymer Science and Technology*, Third Edition, 2003, Volume 1, pp. 256-290 (John Wiley & Sons, Inc., Hoboken, N.J.), which is incorporated in its entirety in this application by this reference.) A non-limiting specific example of a PSA is an adhesive comprising a block copolymer of styrene and elastomer having a density of 0.96 g/cm$^3$ and available as M3156 from Bostik Findley, Inc. (Wauwatosa, Wis.).

As used throughout this application, the term "modified" refers to a chemical derivative, such as one having any form of anhydride functionality (e.g., anhydride of maleic acid, crotonic acid, citraconic acid, itaconic acid, fumaric acid, etc.), whether grafted onto a polymer, copolymerized with a polymer or blended with one or more polymers. The term is also inclusive of derivatives of such functionalities, such as acids, esters and metal salts derived from such.

As used throughout this application, the term "sealant" refers to a film or film layer involved in the sealing of a sheet, film or web to itself; or to another object, sheet, film or web. In general, a sealant material may include a monolayer or multilayer film having an outer film layer which is heat sealable. Alternatively, a sealant material may include a monolayer or multilayer film having an outer film layer which is an adhesive. The term "heat sealable material" refers to any material capable of fusion bonding by conventional indirect heating means which generate sufficient heat on at least one film contact surface for conduction to the contiguous film contact surface and formation of a bond interface therebetween without loss of the layer integrity. Advantageously, the bond interface is preferably sufficiently thermally stable to prevent gas or liquid leakage therethrough when exposed to above or below ambient temperatures, such as those during one or more of the following: packaging operations, storage, handling, transport, display or processing of packaged product. Heat seals may be designed to meet different conditions of expected use and various heat seal formulations are known in the art and may be employed with the present disclosure.

As used throughout this application, the terms "styrenic polymer" or "polystyrene" refer to a homopolymer or copolymer having at least one styrene monomer linkage (such as benzene (i.e., $C_6H_5$) having an ethylene substituent) within the repeating backbone of the polymer. The styrene linkage can be represented by the general formula: $[CH_2-CH_2(C_6H_5)]_n$. Polystyrene may be formed by any method known to those skilled in the art. Examples of styrenic polymers include but are not limited to high impact polystyrene (HIPS), super high impact polystyrene (SHIPS), general purpose polystyrene (GPPS), styrene acrylonitrile (SAN), styrene block copolymer (SBC), and acrylonitrile butadiene styrene (ABS). HIPS is sometimes called rubber-modified polystyrene and is normally produced by copolymerization of styrene and a synthetic rubber. (See Wagner, et al., "Polystyrene," *The Wiley Encyclopedia of Packaging Technology*, Second Edition, 1997, pp. 768-771 (John Wiley & Sons, Inc., New York, N.Y.), which is incorporated in its entirety in this application by this reference.) Examples of HIPS include but are not limited to Impact Polystyrene 825E and Impact Polystyrene 945E, both of which are available from Total Petrochemicals USA, Inc; EB6025 Rubber Modified High Impact Polystyrene, which is available from Chevron Phillips Company (The Woodlands, Tex.); and 6210 High Impact Polystyrene, which is available from Ineos Nova LLC (Channahon, Ill.). Examples of SHIPS include but are not limited to TOTAL Petrochemicals 945E which is available from TOTAL PETROCHEMICALS USA, INC. (Houston, Tex.) and STYRON® 487 High Impact Polystyrene available from Styron LLC (Berwyn, Pa.). GPPS is often called crystal polystyrene, as a reference to the clarity of the resin. Examples of GPPS include but are not limited to Crystal Polystyrene 524B and Crystal Polystyrene 525B, both of which are available from Total Petrochemicals USA, Inc. Non-limiting examples of styrene acrylonitrile (SAN) are the TYRIL™ family of SANs provided by Styron LLC (Berwyn, Pa.) and the Lustran® SAN family of resins available from INEOS ABS (Köln, Germany). Styrene block copolymers (SBC) include styrene butadiene copolymers (SB). The styrene-butadiene copolymers that are suitable for packaging applications are those resinous block copolymers that typically contain a greater proportion of styrene than butadiene and that are predominantly polymodal with respect to molecular weight distribution. (See Hartsock, "Styrene-Butadiene Copolymers," *The Wiley Encyclopedia of Packaging Technology*, Second Edition, 1997, pp. 863-864 (John Wiley & Sons, Inc., New York, N.Y.), which is incorporated in its entirety in this application by this reference.) A non-limiting example of SB is DK13 K-Resin® Styrene-Butadiene Copolymer, which is available from Chevron Phillips Chemical Company (The Woodlands, Tex.). Acrylonitrile Butadiene Styrene (ABS) is a terpolymer of acrylonitrile, butadiene and styrene. Usual compositions are about half styrene with the balance divided between butadiene and acrylonitrile. Considerable variation is, of course, possible resulting in many different grades of acrylonitrile butadiene styrene with a wide range of features and applications. In addition, many blends with other materials such as polyvinylchloride, polycarbonates and polysulfones have been developed. Acrylonitrile butadiene styrene materials can be processed by any of the standard thermoplastic processing methods.

As used throughout this application, the term "polyester" refers to a homopolymer or copolymer having an ester linkage between monomer units which may be formed, for example, by condensation polymerization reactions between a dicarboxylic acid and a diol. The ester linkage can be represented by the general formula: $[O-R-OC(O)-R'-C(O)]_n$, where R and R' are the same or different alkyl (or aryl) group and may be generally formed from the polymerization of dicarboxylic acid and dial monomers or a monomer containing both carboxylic acid and hydroxyl moieties. The carboxylic acid (including the carboxylic acid moieties) may be linear or aliphatic (e.g., lactic acid, oxalic acid, maleic acid, succinic acid, glutaric acid, adipic acid, pimelic acid, suberic acid, azelaic acid, sebacic acid, and the like) or may be aromatic or alkyl substituted aromatic (e.g., various isomers of phthalic acid, such as paraphthalic acid (or terephthalic acid), isophthalic acid and naphthalic acid). Specific examples of a useful diol include but are not limited to ethylene glycol; propylene glycol; trimethylene glycol; 1,4-butane diol; neopentyl glycol; cyclohexane diol; 2,2,4,4-tetramethyl-1,3-cyclobutanediol and the like.

As used throughout this application, the term "aromatic polyester" refers to any polyester having at least one phenyl (or benzene) moiety within one or both monomer repeating units used to form the material. Specific non-limiting examples of aromatic polyesters include a homopolymer or copolymer of alkyl-aromatic esters including but not limited to polyethylene terephthalate (PET), amorphous polyethylene terephthalate (APET), crystalline polyethylene terephthalate (CPET), glycol-modified polyethylene terephthalate (PETG), polyethylene naphthalate (PEN) and polybutylene terephthalate (PBT); a copolymer of terephthalate and isophthalate including but not limited to polyethylene terephthalate/isophthalate copolymer; and blends of any of these materials. A non-limiting example of APET is Eastman™ PET 9921, which is available from Eastman Chemical Company (Kingsport, Tenn.). A non-limiting example of PETG is Eastar™ Copolyester 6763, which is also available from Eastman Chemical Company (Kingsport, Tenn.). A non-limiting example of APET include ParaStar™ 2400 and PET 9921 polyethylene terephthalate both available from Eastman Chemical Company (Kingsport, Tenn.); Performance™ PET 1708 available from StarPet, Inc. (Asheboro, N.C.); and CLEARTUF® 8006 polyester resin available from Gruppo Mossi & Ghisolfi (Wilmington, N.C.).

As used throughout this application, the terms "primer" and "primer coat" refers to a material that is placed between one layer and an adjacent layer to anchor one layer to another layer. Those skilled in the art may also be referred to the term "primer" as an "anchor coat material" or "undercoat material."

As used throughout this application, the term "polyethylene" or "PE" refers (unless indicated otherwise) to ethylene homopolymers as well as copolymers of ethylene with at least one alpha-olefin. The term will be used without regard to the presence or absence of substituent branch groups.

As used throughout this application, the term "high density polyethylene" or "HDPE" refers to both (a) homopolymers of ethylene which have densities from about 0.960 $g/cm^3$ to about 0.970 $g/cm^3$ and (b) copolymers of ethylene and an alpha-olefin (usually 1-butene or 1-hexene) which have densities from about 0.940 $g/cm^3$ to about 0.958 $g/cm^3$. HDPE includes polymers made with Ziegler or Phillips type catalysts and polymers made with single-site metallocene catalysts. HDPE also includes high molecular weight "polyethylenes." In contrast to HDPE, whose polymer chain has some branching, are "ultra high molecular weight polyethylenes," which are essentially unbranched specialty polymers having a much higher molecular weight than the high molecular weight HDPE. HDPE may be further described as a semicrystalline polymer. It is a homopolymer when the density is ≥0.960 g/cm3 and a copolymer when the density is below this value. HDPE is available in a wide range of molecular weights as determined by either melt index (MI) or HLMI (high-load melt index). (See Carter, "Polyethylene, High-Density," *The Wiley Encyclopedia of Packaging Technology*, Second Edition, 1997, pp. 745-748 (John Wiley & Sons, Inc., New York, N.Y.), which is incorporated in its entirety in this application by this reference.) Specific non-limiting examples of HDPE include Alathon® M6020 available from Equistar Chemicals LP (Houston, Tex.); Alathon® L5885 available from Equistar Chemicals LP (Houston, Tex.); ExxonMobil™ HDPE HD 7925.30 available from ExxonMobil Chemical Company (Houston, Tex.); ExxonMobil™ HDPE HD 7845.30 available from ExxonMobil Chemical Company (Houston, Tex.); and Surpass® HPs167-AB available from Nova Chemicals Corporation (Calgary, Alberta, Canada). In embodiments of the packaging sheet which comprise HDPE, HDPE may be blended with nucleating agent, the HDPE may have a medium molecular weight, a melt index within the range of about 0.5 to about 50 dg/min, a density greater than or equal to about 0.941 g/cm$^3$, a long chain branching index or less than or equal to about 0.5 and a melt flow ratio less than or equal to about 65. (See US Patent Application 2007/0036960, published Feb. 15, 2007, which is incorporated in its entirety in this application by this reference.)

A nucleating agent may comprise any of those nucleating agents disclosed in U.S. Pat. No. 6,969,556, issued Nov. 29, 2005, which is incorporated in its entirety in this application by this reference. More specifically, as a non-limiting example, the nucleating agent may comprise glycerol alkoxide salts, hexahydrophthalic acid salts, similar salts or mixtures of such salts, as disclosed in US Patent Application 2008/0227900, published Sep. 18, 2008, and in US Patent Application 2007/0036960, published Feb. 15, 2007, both are which are incorporated in their entireties in this application by this reference. Such salts include ammonium and metal salts, including but not limited to zinc, magnesium, calcium and mixtures of such metals. An example of a zinc glycerolate nucleating agent is Irgastab® 287 available from Ciba Specialty Chemicals Holding, Inc. (Basel, Switzerland). An example of a calcium hexahydrophthalate is Hyperform® HPN-20E available from Milliken & Company (Spartanburg, S.C.). Calcium hexahydrophthalate is also available blended with LDPE as Polybatch® CLR122 available from A. Schulman Inc. (Akron, Ohio). The nucleating agent may be included in barrier component layer (or layers) in an amount from about 0.002% to about 0.2% by weight (of the layer) or from about 0.02% to about 0.12% by weight.

As used throughout this application, the term "low density polyethylene" or "LDPE" refers to branched homopolymers having densities between 0.915 g/cm$^3$ and 0.930 glcm$^3$, as well as copolymers containing polar groups resulting from copolymerization (such as with vinyl acetate or ethyl acrylate). LDPE typically contains long branches off the main chain (often termed "backbone") with alkyl substituents of two to eight carbon atoms.

As used throughout this application, the term "copolymer of ethylene and at least one alpha-olefin" refers to a modified or unmodified copolymer produced by the co-polymerization of ethylene and any one or more alpha-olefins. Suitable alpha-olefins include, for example, $C_3$ to $C_{20}$ alpha-olefins such as propene, 1-butene, 1-pentene, 1-hexene, 1-octene, 1-decene and combinations of such. The co-polymerization of ethylene and an alpha-olefin may be produced by heterogeneous catalysis, such as co-polymerization reactions with Ziegler-Natta catalysis systems, including, for example, metal halides activated by an organometallic catalyst (e.g., titanium chloride) and optionally containing magnesium chloride complexed to trialkyl aluminum. Heterogeneous catalyzed copolymers of ethylene and an alpha-olefin may include linear low density polyethylene (LLDPE), very low density polyethylene (VLDPE) and ultra low density polyethylene (ULDPE) (commercially available as, for example, Dowlex™ from The Dow Chemical Company (Midland, Mich.)). Additionally, the co-polymerization of ethylene and an alpha-olefin may also be produced by homogeneous catalysis, such as co-polymerization reactions with metallocene catalysis systems which include constrained geometry catalysts, (e.g., monocyclopentadienyl transition-metal complexes). Homogeneous catalyzed copolymers of ethylene and alpha-olefin may include modified or unmodified ethylene alpha-olefin copolymers having a long-chain branched (i.e., 8-20 pendant carbons atoms) alpha-olefin co-monomer (commercially available as, for example, Affinity™ and Attane™ from The Dow Chemical Company (Midland, Mich.)), linear copolymers (commercially available as, for example, Tafiner™ from the Mitsui Petrochemical Corporation (Tokyo, Japan)), and modified or unmodified ethylene alpha-olefin copolymers having a short-chain branched (i.e., 3-6 pendant carbons atoms) alpha-olefin co-monomer (commercially available as, for example, Exact™ from ExxonMobil Chemical Company (Houston, Tex.)). In general, homogeneous catalyzed ethylene alpha-olefin copolymers may be characterized by one or more methods known to those of skill in the art, including but not limited to molecular weight distribution ($M_w/M_n$), composition distribution breadth index (CDBI), narrow melting point range and single melting point behavior. Examples of copolymers of ethylene and at least one alpha olefin include but are not limited to linear low density polyethylene and plastomers. Specific non-limiting examples of such ethylene copolymers are Dowlex™ 2045 Polyethylene Resin available from The Dow Chemical Company (Midland, Mich.) and Exact™ Plastomers (various grades) available from ExxonMobil Chemical Company (Houston, Tex.). Copolymers of ethylene and at least one alpha olefin are further described below. Examples of copolymers of ethylene and at least one alpha-olefin include but are not limited to butene LLDPE, such as ExxonMobil™ LLDPE LL1001.32 available from ExxonMobil Chemical Company (Houston, Tex.); Dow LLDPE DFDA-7047 NT 7 available from the Dow Chemical Company (Midland, Mich.); Novapol® PF-0118-F available from Nova Chemicals Corporation (Calgary, Alberta, Canada); Sabic® LLDPE 118N available from Sabic Europe (Sittard, The Netherlands); and Exact™ Plastomers available from ExxonMobil Chemical Corporation (Houston, Tex.).

As used throughout this application, the term "ethylene vinyl alcohol copolymer" or "EVOH" refers to copolymers comprised of repeating units of ethylene and vinyl alcohol. Ethylene vinyl alcohol copolymers can be represented by the general formula: $[(CH_2-CH_2)_m-(CH_2-CH(OH))]_n$. Ethylene vinyl alcohol copolymers may include saponified or hydrolyzed ethylene vinyl acrylate copolymers. EVOH refers to a vinyl alcohol copolymer having an ethylene co-monomer and prepared by, for example, hydrolysis of vinyl acrylate copolymers or by chemical reactions with vinyl alcohol. The degree of hydrolysis is preferably at least 50% and, more preferably, at least 85%. Preferably, ethylene vinyl alcohol copolymers comprise from about 28 mole percent to about 48 mole percent ethylene, more preferably, from about 32 mole percent to about 44 mole percent ethylene, and, even more preferably, from about 38 mole percent to about 44 mole percent ethylene. Specific non-limiting examples of EVOH include EVAL™ H171 available from EVAL Company of America (Houston, Tex.); Evasin EV-3801V available from Chang Chun Petrochemical Co., Ltd. (Taipei, Taiwan); and Soarnol® ET3803 available from Soarus L.L.C. (Arlington Heights, Ill.).

As used throughout this application, the terms "polyamide" or "nylon" refer to a homopolymer or copolymer having an amide linkage between monomer units which may be formed by any method known to those skilled in the art. The amide linkage can be represented by the general formula: $[C(O)-R-C(O)-NH-R'-NH]_n$ where R and R' are the same or different alkyl (or aryl) group. Examples of nylon polymers include but are not limited to nylon 6 (polycaprolactam), nylon 11 (polyundecanolactam), nylon 12 (polyauryllactam), nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelaiamide), nylon 10,9 (polydecamethylene azelamide), and nylon 12,12 (polydodecamethylene dodecanediamide). Examples of nylon copolymers include but are not limited to nylon 6,6/6 copolymer (polyhexamethylene adipamide/caprolactam copolymer), nylon 6,6/9 copolymer (polyhexamethylene adipamide/azelaiamide copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), and nylon 6,6/6,9/6 copolymer (polyhexamethylene adipamide/hexamethylene azelaiamide/caprolactam copolymer). Examples of aromatic nylon polymers include but are not limited to nylon 4,I, nylon 6,I, nylon 6,6/6I copolymer, nylon 6,6/6T copolymer, nylon MXD6 (poly-m-xylylene adipamide), poly-p-xylylene adipamide, nylon 6I/6T copolymer, nylon 6T/6I copolymer, nylon MXDI, nylon 6/MXDT/I copolymer, nylon 6T (polyhexamethylene terephthalamide), nylon 12T (polydodecamethylene terephthalamide), nylon 66T, and nylon 6-3-T (poly(trimethyl hexamethylene terephthalamide). Polyamide may be included in the sheets described herein for clarity, thermoformability, high strength and toughness over a broad temperature, range, chemical resistance and/or barrier properties. (See "Nylon," *The Wiley Encyclopedia of Packaging Technology*, Second Edition, 1997, pp. 681-686 (John Wiley & Sons, Inc., New York, N.Y.), which is incorporated in its entirety in this application by this reference.) Specific, non-limiting examples of polyamide include UBE Nylon 5033 B available from UBE Engineering Plastics, S.A. (Castellón, Spain); Ultramid® C40 L 01 available from BASF Corporation (Florham Park, N.J.); Ultramid® C33 01 available from BASF Corporation (Florham Park, N.J.); and a blend of 85% by weight (of the blend) of Ultramid® B36 available from BASF Corporation (Florham Park, N.J.) and 15% by weight of DuPont™ Selar® PA3426 available from E.I. du Pont de Nemours and Company, Inc. (Wilmington, Del.).

As used throughout this application, the term "polyvinylidene chloride" or "PVDC" refers to a polymer derived from vinylidene chloride. PVdC may be formed from the polymerization of vinylide chloride with various monomers including but not limited to acrylic esters and unsaturated carboxyl groups.

Referring now to the drawings, FIG. 1 is a diagrammatic cross-sectional view of a first generic embodiment of the non-oriented packaging sheet described in the present application. Packaging sheet 101 comprises a single rigid component layer: layer 10. (In each of the figures of the present application, the dimensions are not to scale and may be exaggerated for clarity.)

Rigid component layer 10 comprises a blend of an aromatic polyester and styrenic polymer. Preferably, the total amount of styrenic polymer present in the sheet relative to the total weight of the sheet is at least between 3.0% and 4.0% by weight. The total amount of styrenic polymer present in the sheet relative to the total weight of the sheet may be 17% by weight or less, 15% by weight or less, or 12% by weight or less.

More specifically, rigid component layer 10 may comprise a blend of at least one material from the group of PET, APET, PETG, CPET, and blends of such, and at least one material from the group of HIPS, GPPS, SBC, SB, and blends of such. In one embodiment, the blend may comprise at least one material from the group of APET, PETG and blends thereof, and at least one material from the group of HIPS, GPPS and blends thereof. In another embodiment, the blend may comprise at least one material from the group of APET, PETG and blends thereof, and GPPS.

Rigid component layer 10 or any other layers of the packaging sheets described herein may also comprise processing aids and/or color concentrates. Examples of processing aids include but are not limited to slip/antiblock concentrates, such as SKR 17 available from Chevron Phillips Corporation (The Woodlands, Tex.); release agents, such as SF18-350 Polydimethylsiloxane Fluid available from DC Products Pty Ltd (Mt. Waverley, Victoria, Australia); and slip agents, such as IncroMax™ PS available from Croda Polymer Additives (Cowick, United Kingdom). Examples of color concentrates include but are not limited to Accel A14477S6CP1 White Color Concentrate and Accel A19111S4CP1 Blue Color Concentrate, both of which are available from Accel Corporation (Naperville, Ill.).

Rigid component layer 10 may be formed by any extrusion or co-extrusion methods known in the art including, but not limited to, flat die or slot cast co-extrusion techniques. In general, flat die or slot cast die co-extrusion techniques may comprise the sequential steps of (a) adding the selected thermoplastic resins for the rigid component layer to an extruder; (b) heating the thermoplastic resins to form streams of melt-plastified polymers; (c) forcing the streams of melt-plastified polymers through a die to form one or more layers. A preferred method of preparation of sheet 101 is flat die or slot cast extrusion.

Figure 2:
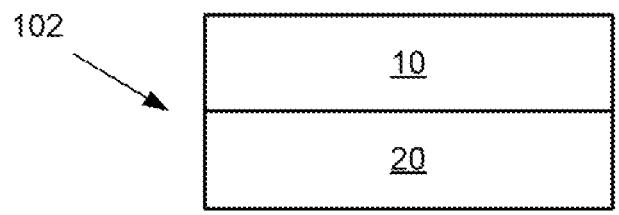
FIG. 2 is a diagrammatic cross-sectional view of a second general embodiment of the non-oriented packaging sheet described in the present application.

Referring to FIG. 2, FIG. 2 is a diagrammatic cross-sectional view of a second generic embodiment of the non-oriented packaging sheet described in the present application. First packaging sheet 102 comprises a single rigid component layer 10 and a generic film 20. Generic film 20 may be one-layer, two-layer, three-layer, four-layer, five-layer, seven-layer, nine-layer, thirteen-layer or any other multilayer film provided that the resulting generic packaging sheet 20 has a thickness of at least 5 mil and a normalized impact strength of 0.16 ft*lbf/mil or less total energy as measured in accordance with ASTM D3763-08 test method (as further defined and described in the EXAMPLES below).

The first rigid component layer 10 and generic film 20 may be formed simultaneously by flat die or slot cast co-extrusion techniques or by separate flat die or slot cast co-extrusion of generic film 20, followed by thermal lamination, adhesive lamination (including solvent or solvent-less lamination), extrusion lamination or extrusion coating of rigid component layer 10 to generic film 20. A preferred method of preparation of sheet 102 is flat die or slot cast co-extrusion.

Figure 3:
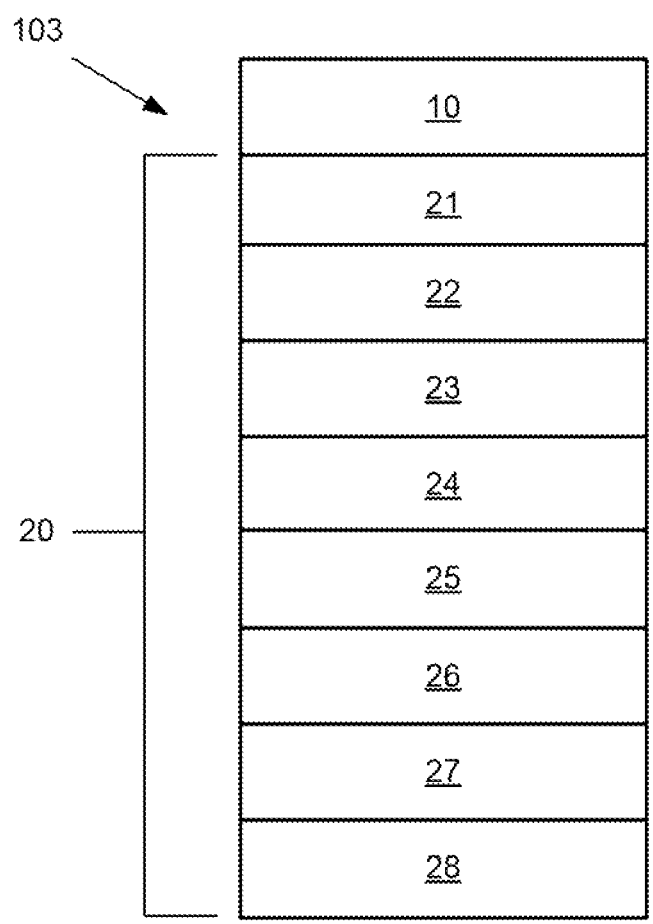
FIG. 3 is a diagrammatic cross-sectional view of a first specific non-limiting embodiment of the non-oriented packaging sheet described in the present application.

Turning now to FIG. 3, FIG. 3 is a diagrammatic cross-sectional view of a first specific non-limiting embodiment of the non-oriented packaging sheet described in the present application. Packaging sheet 103 comprises a first rigid component layer 10 and multilayer film 20. Multilayer film 20 comprises a first intermediate film layer 21, a second intermediate film layer 22, a third intermediate film layer 23, a fourth intermediate film layer 24, a fifth intermediate film layer 25, a sixth intermediate film layer 26, a seventh intermediate film layer 27 and an outer film layer 28.

First intermediate film layer 21 comprises a polyester anchor coating (or primer material).

Second, third, seventh and eighth intermediate film layers 22, 23, 27 and 28 comprise high density polyethylene.

Fourth and sixth intermediate film layers 24 and 26 comprise a tie material. As described above.

Fifth intermediate film layer 25 comprises ethylene vinyl alcohol copolymer (EVOH). EVOH is as described above.

Rigid component layer 10 and film 20 may be formed as described above for packaging sheet 102. A preferred method of preparation of sheet 103 is flat die or slot cast co-extrusion.

Figure 4:
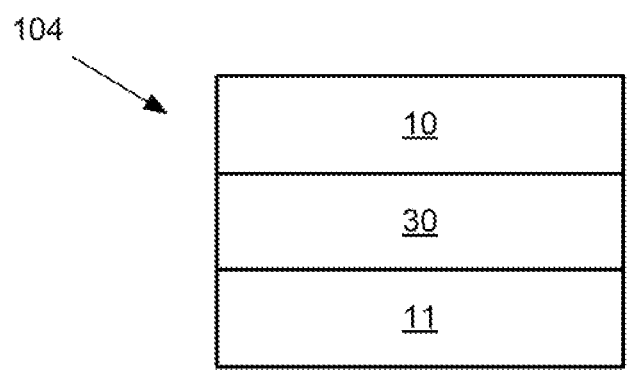
FIG. 4 is a diagrammatic cross-sectional view of a third general embodiment of the non-oriented packaging sheet described in the present application.

Turning now to FIG. 4, FIG. 4 is a diagrammatic cross-sectional view of a third generic embodiment of the non-oriented packaging sheet described in the present application. First packaging sheet 104 comprises a first rigid component layer 10, a generic film 30 and a second rigid component layer 11. As shown, generic multilayer film 30 is positioned between first rigid component layer 10 and a second rigid component layer 11.

First rigid component layer 10 and second rigid component layer 11 comprise a blend of glycol-modified polyethylene terephthalate (PETG) and general purpose polystyrene (GPPS). Glycol-modified polyethylene terephthalate and general purpose polystyrene are described above.

Generic film 30 may be one-layer, two-layer, three-layer, four-layer, five-layer, seven-layer, nine-layer, thirteen-layer or any other multilayer film provided that the resulting generic packaging sheet 20 has a thickness of at least 5 mil and a normalized impact strength of 0.16 ft*lbf/mil or less total energy as measured in accordance with ASTM D3763-08 test method (as further defined and described in the EXAMPLES below).

First rigid component layer 10, second rigid component layer 11 and generic film 30 may be formed by various methods as known in the art. These methods include but are not limited to flat die or slot cast co-extrusion, thermal lamination, adhesive lamination (including solvent or solvent-less lamination), extrusion lamination, extrusion coating and any combination thereof. For example, packaging sheet 104 may be formed according to the method described above for packaging sheet 102. A preferred method of preparation of sheet 104 is flat die or slot cast co-extrusion.

Figure 5:
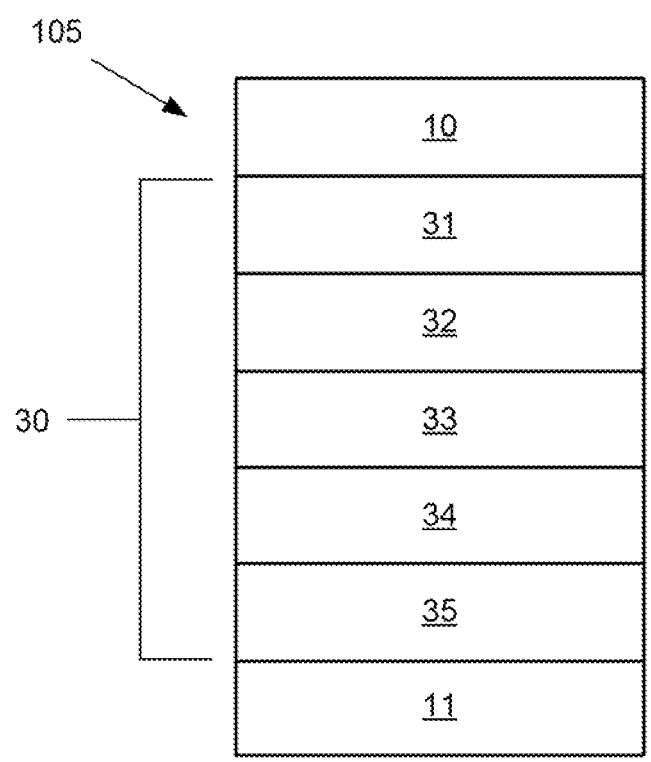
FIG. 5 is a schematic cross-sectional view of a second specific non-limiting embodiment of the non-oriented packaging sheet described in the present application.

Referring to FIG. 5, FIG. 5 is a diagrammatic cross-sectional view of a second specific non-limiting embodiment of the non-oriented packaging sheet described in the present application. Packaging sheet 105 comprises a first rigid component layer 10, a second rigid component layer 11 and multilayer film 30. Multilayer film 30 comprises a first intermediate film layer 31, a second intermediate film layer 32, a third intermediate film layer 33, a fourth intermediate film layer 34, and a fifth intermediate film layer 35. As shown, multilayer film 30 is positioned between first rigid component layer 10 and second rigid component layer 11.

First rigid component layer 10 and a second rigid component layer 11 comprise a blend of glycol-modified polyethylene terephthalate and general purpose polystyrene.

First intermediate film layer 31 and fifth intermediate film layer 35 comprise polyethylene terephthalate (PET) or amorphous polyethylene terephthalate (APET).

Second intermediate film layer 32 and fourth intermediate film layer 34 each comprise a tie material. Tie materials are described above.

Third intermediate film layer 33 comprises ethylene vinyl alcohol copolymer (EVOH). EVOH is as described above.

First rigid component layer 10, second rigid component layer 11 and generic film 30 may be formed by flat die or slot cast co-extrusion or any combination of techniques known to those skilled in the art. A preferred method of preparation of sheet 105 is flat die or slot cast co-extrusion.

Figure 6:
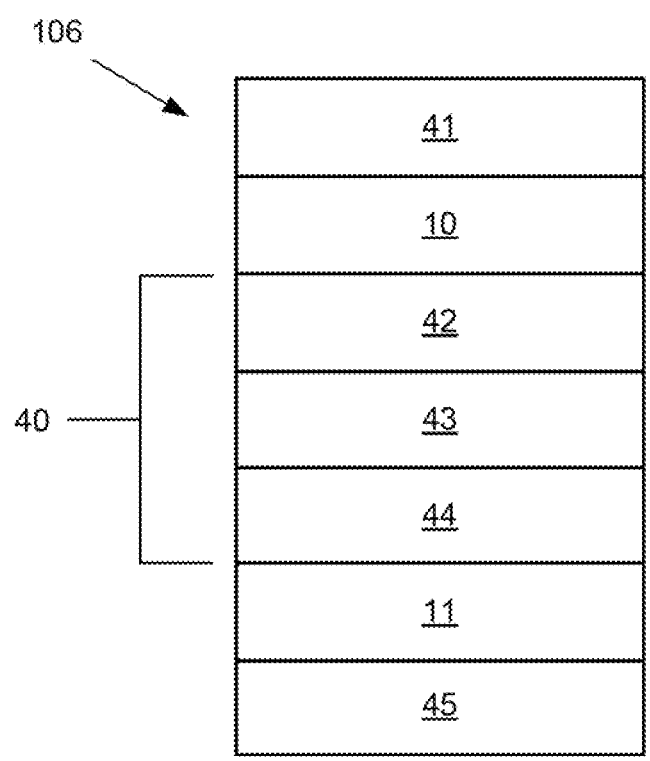
FIG. 6 is a schematic cross-sectional view of a third specific non-limiting embodiment of the non-oriented packaging sheet described in the present application.

Turning now to FIG. 6, FIG. 6 is a diagrammatic cross-sectional view of a third specific non-limiting embodiment of the non-oriented packaging sheet described in the present application. First packaging sheet 106 comprises a first out film layer 41, a first rigid component layer 10, a generic film 40 and a second rigid component layer 11 and a second outer film layer 45. As shown, first and second rigid component layers are intermediate layers.

First rigid component layer 10 and second rigid component layer 11 comprise a blend of amorphous polyethylene terephthalate (APET) and general purpose polystyrene (GPPS). Amorphous polyethylene terephthalate and general purpose polystyrene are described above.

Outer film layers 41 and 42 each comprise glycol-modified polyethylene terephthalate (PETG). Glycol-modified polyethylene terephthalates (PETG) are described above.

Intermediate film layer 42 and intermediate film layer 44 comprise a tie material. Tie materials are described above.

Third intermediate film layer 43 comprises ethylene vinyl alcohol copolymer (EVOH). EVOH is as described above.

Packaging sheet 106 may be formed by flat die or slot cast co-extrusion or any combination of techniques known to those skilled in the art. A preferred method of preparation of sheet 106 is flat die or slot cast co-extrusion.

Generic packaging sheets 101, 102 as embodied in packaging sheet 103, generic packaging sheet 104 as embodied in packaging sheet 105, and packaging sheet 106, may be included in a package for a product. In one embodiment, the package comprising the packaging sheet described in this application may be a thermoformed package resulting from the packaging sheet having been thermoformed.

A description of "thermoformed" is provided above. Furthermore, thermoforming and other similar techniques are well known in the art for packaging. (See Throne, "Thermoforming," *Encyclopedia of Polymer Science and Technology*, Third Edition, 2003, Volume 8, pp. 222-251 (John Wiley & Sons, Inc., Hoboken, N.J.), which is incorporated in its entirety in this application by this reference; see also Irwin, "Thermoforming," *Modern Plastics Encyclopedia*, 1984-1985, pp. 329-336 (McGraw-Hill, Inc., New York, N.Y.), which is incorporated in its entirety in this application by this reference; see also "Thermoforming," *The Wiley Encyclopedia of Packaging Technology*, Second Edition, 1997, pp. 914-921 (John Wiley & Sons, Inc., New York, N.Y.), which is incorporated in its entirety in this application by this reference.) Suitable thermoforming methods include standard, deep-draw or plug-assist vacuum forming. During standard vacuum forming, a thermoplastic web, such as a film or sheet, is heated and a vacuum is applied beneath the web allowing atmospheric pressure to force the web into a preformed mold. When relatively deep molds are employed, the process is referred to as a "deep-draw" application. In a plug-assist vacuum forming method, after the thermoplastic web has been heated and sealed across a mold cavity, a plug shape similar to the mold shape impinges on the thermoplastic web and, upon the application of vacuum, the thermoplastic web conforms to the mold surface.

The thermoformed package comprising the packaging sheet described in the present application may be a cup, a tub, a bucket, a tray or a myriad of other items. Furthermore, the product contained in the thermoformed package may be a food, non-food, medical and/or industrial product. Examples of such products include but are not limited to syrups (including but not limited to breakfast syrup, cough syrup, etc.), creams, cheeses, condiments (including but not limited to salad dressings, jellies, jams, ketchup, etc.), personal care items (including but not limited to shampoos, hand creams, mouthwashes, toothpastes, antacids, etc.), medications, liquid detergents, oils, pates, pet foods, glues, beverages (including alcoholic and non-alcoholic) and confections (including but not limited to hard sweets, fudge, toffee, licorice, chocolate, jelly candies, marshmallow, marzipan, divinity, pastry, chewing gum, ice cream, etc.).

In producing the films and sheets described in the present application, it will be appreciated by those skilled in the art that such parameters as the co-extrusion die opening, nip roll speed, flow rate of the sheet extrudate from the coextrusion die, melt temperatures, type of cooling medium (e.g. water or air), and internal and external sheet extrudate cooling temperatures may all be adjusted to optimize process conditions. For example, the sheet extrudate may be conditioned or modified, such as by internal and/or external application and variation of the types, amounts and characteristics of materials (including gaseous or liquid fluids contacting the extrudate) as well as by setting and changing such parameters as pressures and temperatures. It will be understood in the art that such parameters may vary and will depend upon practical considerations, such as the particular thermoplastic resins comprising the sheet extrudate, the presence or absence of modifying agents, the equipment used, desired rates of production, desired extrudate size (including width and thickness), and the quality and desired performance characteristics of the sheet extrudate. These and other process parameters are expected to be set by one skilled in the art without undue experimentation.

The multilayer sheets having one or more rigid component layers and a multilayer film may be produced by flat die or slot cast co-extrusion methods. Cast co-extrusion methods are well known to those skilled in the art. Alternatively, a multilayer film may be produced separately and then a rigid component layer may be attached to a first surface of the film. If desired, a second rigid component layer may then be attached to the opposing second surface, if desired. The first rigid component layer and the second rigid component layer may be attached by various methods as known in the art. These methods include but are not limited to thermal lamination, adhesive lamination (including solvent or solvent-less lamination), extrusion lamination and extrusion coating. As described above, the parameters for such lamination or coating are expected to be set by one skilled in the art without undue experimentation.

EXAMPLES

Examples 1-14 are packaging sheets exemplifying the present invention. Each of these packaging sheets is produced, generally, as follows: For Examples 1-5, the monolayer sheets are produced by flat die or slot cast extrusion and are shown in TABLE 1 and TABLE 2. For Example 14, a seven-layer cast, coextruded film is produced and an outer layer is extrusion coated on a first surface of the film. Example 14 is shown in TABLE 6. For Examples 6-13, the multilayer sheets are produced by flat die or slot cast co-extrusion. Examples 6-8, 9-11, and 12-13 are shown in TABLE 3, TABLE 4 and TABLE 5, respectively.

Comparative Examples are also produced and/or were obtained. Comparative Examples 1 and 3 are produced by flat die or slot cast co-extrusion. Comparative Example 2 is produced by first forming a seven-layer, cast, coextruded film and then a rigid component layer is extrusion coated on a first surface of the film.

The monolayer sheet of Examples 1-8 and Comparative Example 1 have the compositions (by approximate weight percent), the total weight basis of the sheet, the total weight percent of aromatic polyester in the sheet, the total weight percent of styrenic polymer in the sheet, and sheet thickness shown in TABLE 1 and TABLE 2; and the seven-layer sheet of Examples 6-13 and Comparative Example 3 have the compositions (by approximate weight percent), the total weight basis of the sheet, the total weight percent of aromatic polyester in the sheet, the total weight percent of styrenic polymer in the sheet, and the sheet thickness shown in TABLE 3, TABLE 0.4 and TABLE 5. The nine-layer sheet of Example 14 and Comparative Example 2 have the compositions (by approximate weight percent), the total weight basis of the sheet, the total weight percent of aromatic polyester in the sheet, the total weight percent of styrenic polymer in the sheet, and the sheet thickness shown in TABLE 6. It should be understood that the total weight percent of the aromatic polyester or styrene in the sheet in TABLE 1 and TABLE 2 is calculated by dividing the basis weight of each material by the total basis weight of the sheet. The total weight percent of the aromatic polyester or styrenic polymer in the sheets in TABLE 3, TABLE 4, TABLE 5 and TABLE 6 is calculated by determining the basis weight of each material in each layer, adding the basis weights of each material in each layer together, then dividing this total by the total basis weight of the sheet. The basis weight of each material in each layer is determined by multiplying the percent of each material in the layer composition times the basis weight of the layer.

TABLE 1

|  | Example 1 | Example 2 | Example 3 |
|---|---|---|---|
| Layer Composition | (APET + GPPS) | (APET + GPPS) | APET |
| Basis Wt. of Aromatic Polyester | 196 | 190 | 184 |
| Basis Wt. of Styrene | 4 | 10 | 16 |
| Total Basis Wt. of Sheet | 200 | 200 | 200 |
| Total Weight % of Aromatic Polyester in Sheet | 98 | 95 | 92 |
| Total Weight % of Styrene in Sheet | 2 | 5 | 8 |
| Thickness of Sheet (mil) | 8.80 | 8.94 | 9.10 |

TABLE 2

|  | Example 4 | Example 5 | Comparative Example 1 |
|---|---|---|---|
| Layer Composition | (APET + GPPS) | (APET + GPPS) | APET |
| Basis Wt. of Aromatic Polyester | 180 | 176 | 200 |
| Basis Wt. of Styrene | 20 | 24 | 0 |
| Total Basis Wt. of Sheet | 200 | 200 | 200 |
| Total Weight % of Aromatic Polyester in Sheet | 90 | 88 | 100 |
| Total Weight % of Styrene in Sheet | 10 | 12 | 0 |
| Thickness of Sheet (mil) | 9.19 | 9.58 | 9.10 |

TABLE 3

|  | Composition (% of Layer) | | |
|---|---|---|---|
| Layer # (Basis Wt.) | Example 6 | Example 7 | Example 8 |
| Layer 1 (33.74) | PETG:GPPS (95:5) | PETG:GPPS (90:10) | PETG:GPPS (85:15) |
| Layer 2 (112.74) | APET (100) | APET (100) | APET (100) |
| Layer 3 (10.12) | TIE-1 (100) | TIE-1 (100) | TIE-1 (100) |
| Layer 4 (24.20) | EVOH-1 (100) | EVOH-1 (100) | EVOH-1 (100) |
| Layer 5 (10.12) | TIE-1 (100) | TIE-1 (100) | TIE-1 (100) |
| Layer 6 (112.74) | APET (100) | APET (100) | APET (100) |
| Layer 7 (33.74) | PETG:GPPS (95:5) | PETG:GPPS (90:10) | PETG:GPPS (85:15) |
| Total Basis Wt. of Sheet | 337.70 | 337.70 | 337.70 |
| Total Weight % of Aromatic Polyester in Sheet | 85.60 | 84.60 | 83.60 |
| Total Weight % of Styrene in Sheet | 1.00 | 2.00 | 3.00 |
| Thickness of Sheet (mil) | 18.00 | 18.00 | 17.50 |

TABLE 4

|  | Composition (% of Layer) | | |
|---|---|---|---|
| Layer # (Basis Wt.) | Example 9 | Example 10 | Example 11 |
| Layer 1 (33.74) | PETG:GPPS (80:20) | PETG:GPPS (75:25) | PETG (100) |
| Layer 2 (112.74) | APET (100) | APET (100) | APET:GPPS (95:5) |
| Layer 3 (10.12) | TIE-1 (100) | TIE-1 (100) | TIE-1 (100) |
| Layer 4 (24.20) | EVOH-1 (100) | EVOH-1 (100) | EVOH-1 (100) |
| Layer 5 (10.12) | TIE-1 (100) | TIE-1 (100) | TIE-1 (100) |
| Layer 6 (112.74) | APET (100) | APET (100) | APET:GPPS (95:5) |
| Layer 7 (33.74) | PETG:GPPS (80:20) | PETG:GPPS (75:25) | PETG (100) |
| Total Basis Wt. of Sheet | 337.70 | 337.70 | 337.70 |
| Total Weight % of Aromatic Polyester in Sheet | 82.60 | 81.60 | 83.50 |
| Total Weight % of Styrene in Sheet | 4.00 | 5.00 | 3.34 |
| Thickness of Sheet (mil) | 17.50 | 18.65 | 18.50 |

TABLE 5

| Layer # | Composition (% of Layer) [Basis Wt.] | | | | | |
|---|---|---|---|---|---|---|
|  | Example 12 | | Example 13 | | Comparative Example 3 | |
| Layer 1 | PETG (100) | [33.74] | PETG (100) | [33.74] | PETG (100) | [24.12] |
| Layer 2 | APET:GPPS (90:10) | [112.74] | APET:GPPS (75:25) | [112.74] | APET (100) | [122.36] |
| Layer 3 | TIE-1 (100) | [10.12] | TIE-1 (100) | [10.12] | TIE-1 (100) | [10.12] |
| Layer 4 | EVOH-1 (100) | [24.20] | EVOH-1 (100) | [24.20] | EVOH-1 (100) | [24.20] |
| Layer 5 | TIE-1 (100) | [10.12] | TIE-1 (100) | [10.12] | TIE-1 (100) | [10.12] |
| Layer 6 | APET:GPPS (90:10) | [112.74] | APET:GPPS (75:25) | [112.74] | APET (100) | [122.36] |
| Layer 7 | PETG (100) | [33.74] | PETG (100) | [33.74] | PETG (100) | [24.12] |
| Total Basis Wt. of Sheet | 337.70 | | 337.70 | | 337.40 | |
| Total Weight % of Aromatic Polyester in Sheet | 80.10 | | 70.10 | | 100 | |
| Total Weight % of Styrene in Sheet | 6.68 | | 16.70 | | 0 | |
| Thickness of Sheet (mil) | 18.30 | | 18.52 | | 17.70 | |

TABLE 6

| Layer # | Composition (% of Layer) [Basis Wt.] | | | |
|---|---|---|---|---|
| | Example 14 | | Comparative Example 2 | |
| Layer 1 | APET:GPPS (90:10) | [149.10] | APET (100) | [165.70] |
| Layer 2 | PRIMER:Solvent (97.35:2.65) | [1.00] | PRIMER:Solvent (97.35:2.65) | [1.00] |
| Layer 3 | HDPE-1:Additive (99.50:0.50) | [5.42] | HDPE-1:Additive (99.50:0.50) | [5.42] |
| Layer 4 | HDPE-2 (100) | [6.74] | HDPE-2 (100) | [6.74] |
| Layer 5 | HDPE-2:Tie-2:LLDPE (60:25:15) | [2.32] | HDPE-2:Tie-2:LLDPE (60:25:15) | [2.32] |
| Layer 6 | EVOH-2 (100) | [3.89] | EVOH-2 (100) | [3.89] |
| Layer 7 | HDPE-2:Tie-2:LLDPE (60:25:15) | [2.32] | HDPE-2:Tie-2:LLDPE (60:25:15) | [2.32] |
| Layer 8 | HDPE-2 (100) | [6.74] | HDPE-2 (100) | [6.74] |
| Layer 9 | HDPE-1:Additive (99.50:0.50) | [6.77] | HDPE-1:Additive (99.50:0.50) | [6.77] |
| Total Basis Wt. of Sheet | 200.90 | | 200.90 | |
| Total Weight % of Aromatic Polyester in Sheet | 74.22 | | 82.48 | |
| Total Weight % of Styrene in Sheet | 8.26 | | 0 | |
| Thickness of Sheet (mil) | 10.50 | | 10.50 | |

The materials included in the various sheets are as follows:

APET is an amorphous polyethylene terephthalate copolymer which has a reported bulk density of 0.817 g/cm$^3$, a reported density of 1.33 g/cm$^3$, a reported crystalline melting temperature of about 238° C., a reported haze of 0.800% and is commercially available as Eastman PET 9921 from Eastman Chemical Company (Kingsport, Tenn.).

GPPS is a crystal (i.e., general purpose) polystyrene, has a reported melt flow (200° C./5 kg) of about 9.0 g/10 min, a reported Vicat softening of about 101° C. and a reported density of about 1.04 g/cm$^3$ and is commercially available as Crystal Polystyrene 524 from Total Petrochemicals USA, Inc. (Houston, Tex.).

PETG is a glycol-modified polyethylene terephthalate having a reported density of 1.27 g/cm$^3$, a haze of 0.8% a transparency of 85% and is commercially available as Eastar™ copolyester 6763 from Eastman Chemical Company (Kingsport, Tenn.).

Tie-1 is a modified polyolefin having a reported density of 0.890 g/cm$^3$ and a reported melt index of 3.1 g/10 min (at 190° C./2.16 kg) and is commercially available as Admer® SF755A from Mitsui Chemicals America, Inc. (Toyko, Japan).

Tie-2 is a anhydride-mOdified linear low-density polyethylene having a reported melt index of 2.7 dg/min, a reported density of 0.91 g/cm$^3$, a reported melting point of 115° C., a Vicat softening point of 103° C. and is commercially available as Bynel® 41E710 from E. I. du Pont de Nemours and Company (Wilmington, Del.).

EVOH-1 is an ethylene vinyl alcohol copolymer having a reported ethylene content of about 38 mole percent, a reported density of about 1.17 g/cm$^3$ and a reported melting point of about 173° C. and is commercially available as Soarnol® ET3803 from Soarus L.L.C. (Arlington Heights, Ill.).

EVOH-2 is an ethylene vinyl alcohol copolymer having reported ethylene content of 38 mole percent, a reported melt index of 1.7 g/10 min (at 190° C./2.16 kg), a reported density of 1.17 g/cm$^3$, a reported melt temperature of 172° C., a reported glass transition temperature of 53° C. and is commercially available as EVAL® H171 from Kuraray Chemical Company, Ltd. (Osaka, Japan).

Primer is a polyvinylidene chloride (PVDC) water-based barrier adhesive emulsion having a reported solids content of 50 percent and is commercially available as SERFENE™ 2010 from Dow Chemical Company (Midland, Mich.).

Solvent is isopropyl alcohol.

HDPE-1 is a medium molecular weight high density polyethylene having a reported density of 0.958 g/cm$^3$, a reported melt index of about 0.850 g/10 min, a reported melt temperature range of between 199° C. and 210° C. and is commercially available as Alathon® L5885 from Equistar Chemicals, LP (Houston, Tex.).

HDPE-2 is a moisture-barrier high density homopolymer of polyethylene having a reported melt index of 1.2 g/10 min (at 190° C./2.16 kg), a reported density of 0.966 g/cm3, a moisture vapor transmission rate of 1.1 g/m$^3$/24 h at 38° C., 100% RH and is commercially available as Surpass® HPs167-AB available from Nova Chemicals Corporation (Calgary, Alberta, Canada).

LLDPE is a linear low density polyethylene having a reported density of 0.918 g/cm$^3$, a reported melt flow of 2.00 g/10 min, a haze of 12% and is commercially available as Petrothene® GA502-24 from Equistar Chemicals, LP (Houston, Tex.).

Additive is a polyethylene processing aid having a Dynamar™ FX 5920A content of 3 percent and is commercially available as Ampacet 10919 from Ampacet Corporation (Tarrytown, N.Y.). Processing aids used vary depending on the equipment used and include antiblock agents, slip agents, stabilizing agents and release agents. Such aids are known to a person of ordinary skill in the art and may be determined without undue experimentation.

Examples 1-14 and Comparative Examples 1-3 were tested for Dynatup Impact Strength and reported as Total Impact Energy as expressed as ft*lbf (or foot pound-force) and Normalized Total Impact Energy as expressed as ft*lbf/mil (or foot pound-force per mil). For this application, the Total Impact Energy measurements are normalized as per one mil of the packaging sheet thickness.

The measured values of the Total Impact Energy and Normalized Total Impact Energy of Examples 1-14 and Comparative Examples 1-3 are reported in TABLE 7.

TABLE 7

| | Sheet Thickness (mil) | Total Weight % of Aromatic Polyester in Sheet | Total Weight % of Styrenic Polymer in Sheet | Total Impact Energy (ft * lbf) | Normalized Total Impact Energy (ft * lbf/mil) |
|---|---|---|---|---|---|
| Example 1 | 8.80 | 98.00 | 2.00 | 1.56 | 0.18 |
| Example 2 | 8.94 | 95.00 | 5.00 | 0.66 | 0.07 |
| Example 3 | 9.10 | 92.00 | 8.00 | 0.33 | 0.04 |
| Example 4 | 9.19 | 90.00 | 10.00 | 0.17 | 0.02 |
| Example 5 | 9.58 | 88.00 | 12.00 | 0.13 | 0.01 |
| Example 6 | 18.00 | 85.60 | 1.00 | 3.37 | 0.19 |
| Example 7 | 18.00 | 84.60 | 2.00 | 3.39 | 0.19 |
| Example 8 | 17.50 | 83.60 | 3.00 | 2.85 | 0.16 |
| Example 9 | 17.50 | 82.60 | 4.00 | 1.23 | 0.07 |
| Example 10 | 18.65 | 81.60 | 5.00 | 0.79 | 0.04 |
| Example 11 | 18.50 | 83.50 | 3.34 | 1.42 | 0.08 |
| Example 12 | 18.30 | 80.10 | 6.68 | 0.26 | 0.01 |
| Example 13 | 18.52 | 70.10 | 16.70 | 0.16 | 0.01 |
| Example 14 | 10.50 | 74.22 | 8.26 | 0.89 | 0.09 |
| Comparative Example 1 | 9.10 | 100 | 0 | 2.16 | 0.24 |
| Comparative Example 2 | 10.50 | 82.48 | 0 | 1.94 | 0.19 |
| Comparative Example 3 | 17.70 | 100 | 0 | 3.38 | 0.19 |

FIG. 6 describes the relationship between the total weight percent styrenic polymer in the sheet and normalized impact strength of the sheet in Examples 1 to 14 and Comparative Examples 1 to 3.

As shown by the following observations, lower impact strength values correlate to an ease of cutting the packaging sheet.

The non-oriented packaging sheet of Example 9 was thermoformed into a cup and die-cut. No forming or cutting issues were observed.

The non-oriented packaging sheet of Example 12 was thermoformed into a cup and die-cut. No forming or cutting issues were observed.

The non-oriented packaging sheet of Example 14 was thermoformed into a cup and die-cut. No forming or cutting issues were observed.

In contrast, the non-oriented packaging sheet of Comparative Example 2 was thermoformed and die-cut. No thermoforming issues were observed. However, sporadic, incomplete cutting of the thermoformed cup was observed that resulted in a jamming and ultimate shut-down of the die-cutting equipment.

Figure 7:
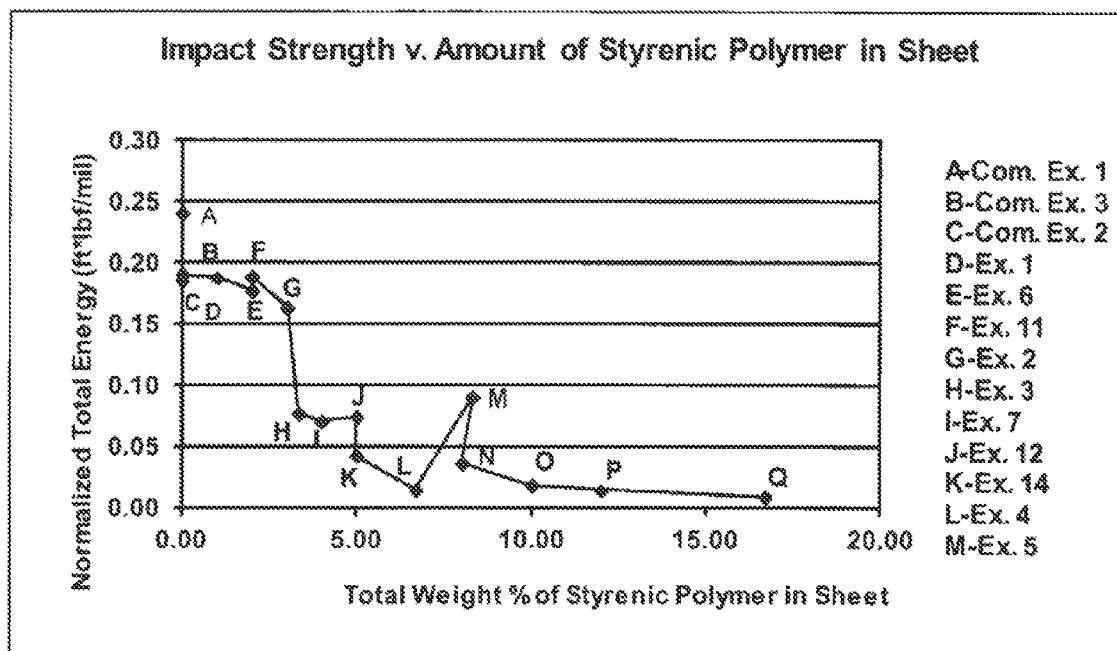
FIG. 7 describes the relationship between the total weight percent styrenic polymer in the sheet and normalized impact strength of the sheet in Examples 1 to 14 and Comparative Examples 1 to 3.

As can be seen from the data in TABLE 7 and FIG. 7, when the total weight percentage of styrenic polymer in the non-oriented packaging sheets increases from about 3% to 4%, a dramatic decrease in impact strength of the sheet is observed. As further shown, an impact strength of 0.16 ft/lbf/mil or less total energy is observed in packaging sheets when the total weight percentage of styrenic polymer in the sheet is at least between 3% and 4%. Without wishing to be bound by theory, non-oriented packaging sheets with a total weight percentage of styrenic polymer of at least between 3% and 4% and an impact strength of 0.16 ft*lbf/mil or less total energy are believed to improve the die-cutting or cuttability of the sheet.

The above description, the examples and the embodiments disclosed in the examples and otherwise are illustrative only and should not be interpreted as limiting. The present invention includes the description, the examples and the embodiments disclosed; but it is not limited to such description, examples or embodiments. Modifications and other embodiments will be apparent to those skilled in the art, and all such modifications and other embodiments are intended and deemed to be within the scope of the present invention as defined by the claims.

What is claimed is as follows:

1. A multilayer non-oriented thermoformable packaging sheet comprising
    a first rigid component layer comprising a blend of an amorphous polyethylene terephthalate or glycol-modified polyethylene terephthalate and a general purpose polystyrene;
    a second rigid component layer comprising a blend of an amorphous polyethylene terephthalate or glycol-modified polyethylene terephthalate and a general purpose polystyrene;
    a coextruded film positioned between and affixed to both the first and second rigid component layers;
    wherein the total combined amount of general purpose polystyrene present in the sheet relative to the total weight of the sheet is at least 3% by weight; and
    wherein the sheet has a thickness of at least 5 mil and a normalized impact strength of 0.16 ft*lbf/mil or less total energy as measured in accordance with ASTM D3763-08 test method.

2. The packaging sheet of claim 1 wherein the first and second rigid component layers are each an outer layer.

3. The packaging sheet of claim 1 wherein the first rigid component and/or the second rigid component have further layers disposed thereon.

4. The packaging sheet of claim 1 wherein the coextruded film comprises a barrier component.

5. The packaging sheet of claim 4 wherein the barrier component is a layer of ethylene vinyl alcohol copolymer.

6. The packaging sheet of claim 4 wherein the barrier component is a layer of ethylene vinyl alcohol copolymer positioned between two layers of tie material.

7. The packaging sheet of claim 4 wherein the barrier component is a layer of ethylene vinyl alcohol copolymer positioned between two layers of nylon or nylon blend.

8. The packaging sheet of claim 1 wherein the total amount of general purpose polystyrene present in the sheet relative to the total weight of the sheet is between 3.0% and 17% by weight.

9. The packaging sheet of claim 1 wherein the total amount of general purpose polystyrene present in the sheet relative to the total weight of the sheet is between 3.0% and 15% by weight.

10. The packaging sheet of claim 1 wherein the total amount of general purpose polystyrene present in the sheet relative to the total weight of the sheet is between 3.0% and 12% by weight.

11. The packaging sheet of claim 1 wherein the sheet has a thickness of between 5 mil and 15 mil.

12. A package for a product wherein the package comprises the packaging sheet of claim 1.

13. The package of claim 12 wherein the packaging sheet is thermoformed.

14. The package of claim 12 wherein the packaging sheet is thermoformed into a cup, a tub, a bucket or a tray.

15. The package of claim 12 wherein the product comprises syrup, cream cheese, condiments, personal care item, medication, liquid detergent, oil, pate, pet food, glue, beverage or confections.

* * * * *

UNITED STATES PATENT AND TRADEMARK OFFICE
CERTIFICATE OF CORRECTION

PATENT NO. : 8,574,694 B2
APPLICATION NO. : 13/310034
DATED : November 5, 2013
INVENTOR(S) : Jesten David Neill et al.

It is certified that error appears in the above-identified patent and that said Letters Patent is hereby corrected as shown below:

On the title page, in item (56), in column 2, under "Other Publications", line 3, delete "D3683-08"," and insert -- D3663-08", --, therefor.

In the Specification

In column 6, line 34, delete "carboyxlated" and insert -- carboxylated --, therefor.

In column 8, line 12, delete "dial" and insert -- diol --, therefor.

In column 9, line 58, delete "0.930 glcm$^3$," and insert -- 0.930 g/cm$^3$, --, therefor.

In column 10, line 26-27, delete "Tafiner™" and insert -- Tafmer™ --, therefor.

In column 11, line 50, delete "temperature," and insert -- temperature --, therefor.

In column 16, line 29, delete "TABLE 0.4" and insert -- TABLE 4 --, therefor.

In column 19, line 51, delete "Toyko," and insert -- Tokyo, --, therefor.

In column 21, line 60, delete "0.16 ft/lbf/mil" and insert -- 0.16 ft*lbf/mil --, therefor.

Signed and Sealed this
Fifth Day of April, 2016

Michelle K. Lee
*Director of the United States Patent and Trademark Office*